Dec. 28, 1937.　　　　C. C. FARMER　　　　2,103,354
MAGNETIC BRAKE SHOE
Filed Sept. 30, 1936
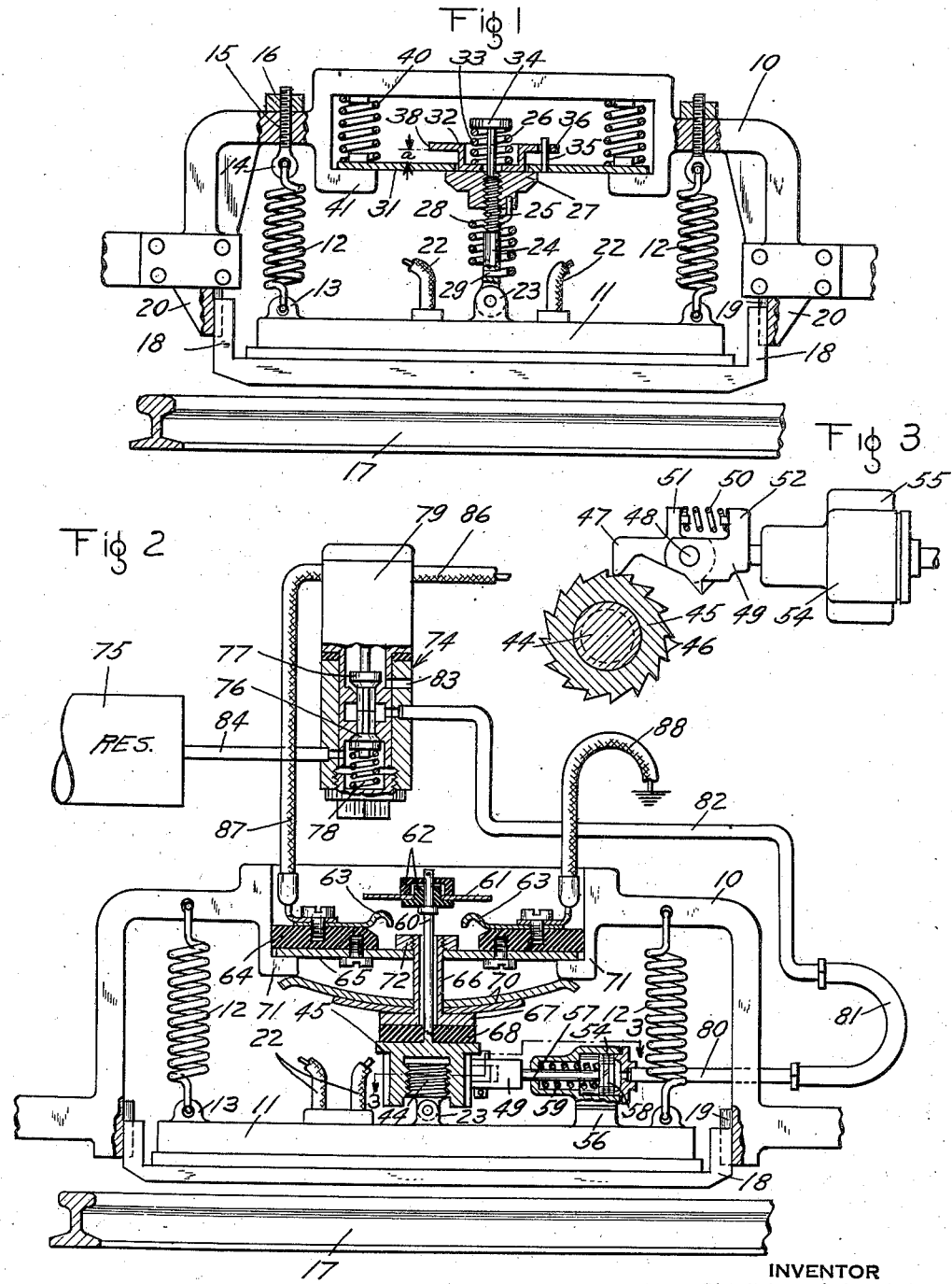
INVENTOR
CLYDE C. FARMER
BY Wm. W. Cady
ATTORNEY Patented Dec. 28, 1937

2,103,354

UNITED STATES PATENT OFFICE 2,103,354

MAGNETIC BRAKE SHOE

Clyde C. Farmer, Pittsburgh, Pa., assignor to The Westinghouse Air Brake Company, Wilmerding, Pa., a corporation of Pennsylvania Application September 30, 1936, Serial No. 103,293

15 Claims. (Cl. 188—165)

This invention relates to magnetic brake shoes, and in particular to magnetic brake shoes for traction vehicles and railway trains.

When magnetic track brake devices are employed as a part of a brake equipment for traction vehicles and railway trains, a desirable mounting arrangement is to suspend the devices above the track rails on springs, and cause them to be attracted to the rails by virtue of their own magnetism, when effecting an application of the brakes. With this type of suspension the brake devices should in release position be held above the rails a substantially fixed distance, as for example three-eighths of one inch.

However, as the rail-engaging shoes forming a part of each brake device wear away this distance will be increased. It is desirable that the distance of the rail-engaging shoes above the track rail be maintained substantially constant, in order that a given minimum energization of the brake devices will always cause them to be attracted to the rails. The present invention has for a pirncipal object the provision of means for maintaining a track brake device suspended a given distance above a track rail regardless of the amount of wear which takes place.

A more specific object of the present invention is to provide a simple and reliable arrangement of purely mechanical devices for maintaining a magnetic track brake device suspended a substantially constant distance above a track rail.

A yet further specific object of the invention is the provision of an electropneumatic mechanism for accomplishing the same result.

Further objects and advantages of the invention will be clearly apparent from the following description, which is taken in connection with the attached drawing, wherein, Fig. 1 shows in diagrammatic form an embodiment of the invention, Fig. 2 shows also in diagrammatic form a different embodiment of the invention, Fig. 3 is a part sectional view taken on the line 3—3 of Fig. 2.

Embodiment of Fig. 1

Referring first to Fig. 1, a portion of a vehicle truck is indicated at 10, this portion being preferably that between the two axles of a two-axle traction vehicle truck. The fragments shown may be a part of a specially designed truck, or a frame portion which is bolted to a more or less standard truck.

A magnetic track shoe device is shown at 11 as suspended from the truck frame portion 10 by two springs 12. One end of each spring 12 is attached to a lug 13 at one end of the track shoe device 11, while the other end of the spring 12 is attached to an eye bolt 14. Each eye bolt 14 passes through an aperture 15 in the truck frame 10 and has disposed thereon, above the truck frame, a nut 16 which may be employed to adjust the height of the track shoe 11 above a track rail 17.

The track brake shoe device 11 is preferably of conventional design, having a casing provided with guide lugs 18 which slide in recesses 19 of guide members 20 attached to the truck frame. The braking thrust produced by the track brake shoe 11, when energized, is of course transmitted to the truck frame 10 through these guide members. Current may be supplied to the track brake device by means of conductors 22 to any degree desired, as is usual practice.

In order to carry out the objects of my invention, the track brake shoe device 11 is preferably provided with a lug 23 disposed approximately midway between the ends of the track brake shoe and on top of the casing. Pivotally carried by the lug 23 is an eye bolt 24 having a threaded portion 25 and an unthreaded portion 26 of somewhat smaller diameter than the threaded portion. Disposed on the threaded portion 25, and having a thread engagement therewith, is a nut or clutch member 27. Also disposed on the eye bolt 24 is a take-up spring 28, which has one end thereof attached to the nut or clutch member 27, and the other end thereof attached to the shank of the eye bolt, as indicated at 29. The spring 28 is so arranged that when placed under tension it tends to turn the nut or clutch member 27 in a direction to back it off the threaded portion 25 of the eye bolt 24. That is to say, the spring 28 tends to move the nut 27 upwardly as viewed in Fig. 1.

When the track shoe device 11 is in the position illustrated, the upper face of the nut or clutch member 27 engages the lower face of a plate 31, and also the lower face of a second clutch member 32. The second clutch member 32 is urged downwardly into engagement with the clutch member 27 by a spring 33 disposed between the member 32 and a spring cap 34 attached to the uppermost end of the stem 26. The clutch member 32 is prevented from rotating by a pin 35 secured to the plate 31 and projecting through an aperture 36 in the clutch member.

The clutch member 32 is provided with an annular flange 38, the under surface of which, in the position of the parts illustrated in Fig. 1, is disposed above the upper surface of the plate 31 by a distance indicated as "a". This distance "a" is that at which it is desired to maintain the rail-engaging members of the track brake device 11 suspended above the track rail 17.

In operation, when the track brake device 11 is deenergized the suspension springs 12 will hold it in the raised position, as illustrated. When the track brake device 11 has current supplied thereto, so as to produce a braking effect, it will be attracted to and in engagement with the track rail 17. As the track shoe device 11 moves toward the rail 17, both the clutch member 27 and the clutch member 32 will move with it. If the distance between the rail-engaging members of the track brake device 11 and the track rail 17 is greater than the distance "a" between the lower surface of the clutch flange 38 and the upper surface of the plate 31, it will be obvious that the flange 38 will engage the plate 31, and the clutch member 27 will disengage from the lower surface of the clutch member 32. When this takes place the spring 28, which will be under tension, will turn the nut or clutch member 27 sufficiently to cause it to reengage the clutch member 32. When the track brake device 11 is then deenergized the suspension springs 12 will move it upwardly until the nut or clutch member 27 engages the lower surface of the plate 31. The height of the rail-engaging members above the track rail 17 will then correspond to the dimension "a".

It will thus be seen that in this manner the track brake device 11 will at all times be maintained a substantially fixed distance above the track rails.

While it is the practice to maintain track rails free of obstructions which might strike the track brake device 11, at times obstructions slightly higher than the distance at which the brake device is carried above the rail will appear on or adjacent the track rail. In order that such obstructions shall not seriously damage a track brake device when engaged by it, yielding springs 40, which hold the plate 31 normally against stops 41, are provided, so that when such obstructions exert sufficient upward pressure on the track brake device 11, the springs 40 will yield to permit the entire adjusting mechanism and the brake shoe to move upwardly far enough to pass over the obstruction.

*Embodiment of Fig. 2*

The embodiment of Fig. 2 illustrates a form of the invention employing electropneumatic control for adjusting the height of the track shoe above a track rail. The parts in this embodiment which correspond to those in the previously described embodiment are indicated by like numerals. The suspension springs 12 are shown in this embodiment as being connected directly to the truck frame member 10 instead of through eye bolts.

Connected to the lug 23 on the track brake device 11 is a threaded member 44, which has disposed thereon and in screw thread engagement therewith a ratch 45. This ratch, as is indicated in Fig. 3, is provided with a plurality of serrations 46 which may be engaged by a pawl 47. The pawl 47 is pivotally connected at 48 to a cross-head member 49, and a spring 50 is interposed between a lug 51 on the pawl and a lug 52 on the cross-head in a manner such that the pawl may swing about the pivot 48 to permit the serrations 46 to pass under the pawl when moving in a counterclockwise direction.

Secured to the upper surface of the casing of the track brake device 11 is a slack take-up cylinder 54. This cylinder is provided with a flange 55 for bolting the cylinder to a lug 56 on the track brake device housing. Disposed within the cylinder 54 and connected to the cross-head 49 by means of a stem 57 is a piston 58, urged toward the right within the cylinder by a spring 59. When fluid under pressure is supplied to the slack take-up cylinder 54, the piston 58 will be actuated to the left, as viewed in Fig. 2, whereupon the pawl 47 will engage the adjacent serration 46 and thus rotate the ratch 45. This will turn the ratch 45 in a direction such that, as viewed in Fig. 2, it moves upwardly with respect to the threaded member 44.

Integral with or secured to the ratch 45 is a stem 60 carrying a contact member 61 supported thereby and insulated therefrom by insulating members 62. The contact 61 is adapted to engage and connect together two stationary contacts 63. Each of the contacts 63 is supported by an insulating member 64, in turn carried by a plate 65 suitably supported on the truck frame 10, as is clearly shown in Fig. 2.

The contact operating stem 60 passes through a sleeve 66 provided with a flange 67. Attached to the flange 67 is a non-metallic member 68, which serves both as an electrical insulator and a stop member for the upper surface of the ratch 45 on the brake shoe device 11.

Carried by the sleeve 66 are two leaf springs 70, the longer of which engages lugs 71 when the track brake device 11 is in its upper or release position. A nut 72 is attached to the upper end of the sleeve 66 for the purpose of limiting the range of downward movement of the sleeve.

The contacts 61 and 63 control the energization of a magnet valve device 74, which device controls the supply of fluid under pressure to and its release from the slack take-up cylinder 54, the source of fluid under pressure being a reservoir 75, which is normally maintained charged from a suitable compressor (not shown).

The magnet valve device 74 is embodied in a casing having a supply valve 76 and a release valve 77 arranged in abutting relationship, and urged toward seated and unseated positions, respectively, by a spring 78. In the upper part of the valve device casing is an electromagnet 79, which when energized actuates the release valve 77 to seated position and the supply valve 76 to unseated position, against the bias of spring 78.

When the supply valve 76 is seated and the release valve 77 is unseated, as illustrated, the slack take-up cylinder 54 is in communication with the atmosphere by way of pipe 80, flexible conduit 81, pipe 82, past the unseated release valve 77, and exhaust port 83. When the release valve 77 is seated, and the supply valve 76 is unseated fluid under pressure will be supplied from the reservoir 75 to the slack take-up cylinder 54 by way of pipe 84, past the unseated supply valve 76, pipe 82, flexible conduit 81, and pipe 80.

The energization of the electromagnet 79 takes place when the contact 61 bridges the two contacts 63, current flowing to the electromagnet by way of conductor 86, and returning to the source by way of conductor 87, the contacts 61 and 63, and ground conductor 88.

In operation, the suspension springs 12 normally hold the track brake device 11 in its raised position where the longer leaf spring 70 engages the lugs 71. In this position of the track brake device the contact 61 will be a predetermined distance above the stationary contacts 63. This distance is preferably directly proportional to that at which it is desired to maintain the rail-engaging shoes of the track brake device suspended above the track rail 17.

When current is supplied to the track brake device 11 to produce a braking effect, the brake device moves toward and in engagement with the track rail. If when the track brake device is energized it is at the correct height above the rail, then as it moves into engagement with the rail the contact 61 will not quite engage the two contacts 63.

If, however, the track brake device is initially suspended above the rail a greater height than desired, then as the track brake device engages the rail, or slightly before, the contact 61 will engage the two contacts 63, and thus cause the magnet valve device 74 to be energized to supply fluid under pressure to the slack take-up cylinder 54. Fluid under pressure supplied this cylinder causes the piston 58 to be moved to the left and thus rotates the ratch 45. The parts are preferably so designed that the rotation thus imparted to the ratch 45 will be sufficient to cause enough upward movement of the stem 60 to disengage contact 61 from contacts 63, for normal wear of the rail-engaging shoes.

When the contact 61 disengages from the contacts 63, the magnet valve device 74 will close the communication from the reservoir 75 to the cylinder 54, and will vent this cylinder to the atmosphere by way of exhaust port 83. It should be obvious therefore that the distance between the under surface of the contact 61 and the upper surfaces of the two contacts 63 determines the normal height at which the track brake device 11 will be suspended above the track rail, and that as the rail-engaging shoes wear, the slack take-up mechanism will function to maintain this distance substantially constant.

If while the vehicle is running, an obstruction should appear on or adjacent the track rail 17, such for example as was assumed in the description of the embodiment of Fig. 1, the track brake device 11 may safely pass over this obstruction due to the yielding action of the leaf springs 70 in permitting the track brake device to move upwardly a greater than the normal distance above the rail.

It will thus be seen from the description of the two embodiments of my invention, that I have provided means whereby a magnetic track brake device may be maintained suspended above a track rail at a substantially constant distance, regardless of the wear which may take place on the rail-engaging shoes, and that while this distance may be of a relatively low value provision is made for permitting the track brake device to pass over obstructions having a height of greater value, without damaging the suspension mechanism.

While I have described my invention with particular reference to two embodiments thereof, it is not only my intention to be limited to the specific details of these embodiments, or otherwise than by the spirit and scope of the appended claims.

Having now described my invention, what I claim as new and desire to secure by Letters Patent, is:

1. In a magnetic track brake system, in combination, a magnetic track brake device, means for yieldingly suspending said track brake device from a vehicle truck frame, and means for automatically maintaining said track brake device suspended in its normal or release position a substantially constant distance above a track rail regardless of wear which may take place on the track brake device due to repeated engagement with the track rail.

2. In a magnetic track brake system, in combination, a magnetic track brake device having rail-engaging shoes the active surface of which wears away during a braking operation, means for resiliently suspending said track brake device from a vehicle truck frame and above a track rail, and means operative while said track brake device is in a rail-engaging position to adjust the height to which said track brake device may rise when released from the rail-engaging position.

3. In a vehicle brake system, in combination, a magnetic track brake device, means for resiliently suspending said track brake device from a vehicle truck and above a track rail, means operative to change the height at which said yielding means maintains said track brake device suspended above said rail, and means for causing said last means to act when the track brake device is moved toward a track rail.

4. In a vehicle brake system, in combination, a magnetic track brake device, suspension means for suspending said track brake device above a track rail, means for adjusting the height of said track brake device above said rail, and means operative to cause said last means to become operative if as said track brake moves toward the rail it passes through greater than a predetermined distance.

5. In a magnetic track brake system, in combination, a magnetic track brake device, resilient means for suspending said track brake device from a vehicle truck frame and above a track rail, a first stationary element, a second element movable with said track brake device, said two elements being disposed in a predetermined spaced relationship when said track brake device is in its raised position, and means operative upon movement of said track brake device toward the track rail for adjusting the distance at which said brake device may be suspended above the rail in its raised position to correspond to that between said two elements.

6. In a magnetic track brake system, in combination, a magnetic track brake device, at least one spring for suspending said track brake device from a vehicle truck and above a track rail, a stop member carried by said brake device for engaging an element carried by the truck frame, said stop member being operative to limit the upward movement of said track brake device and thereby determine the height at which said brake device is maintained suspended above said track rail, and means operative as said track brake device moves toward engagement with said track rail to adjust said stop member in the event that said track brake device is before movement suspended above said rail at a greater than a predetermined distance.

7. In a magnetic track brake system, in combination, a magnetic track brake device, at least one spring for suspending said brake device from a vehicle truck frame and above a track rail, said track brake device having rail-engaging shoes normally subject to wear when engaging a track rail and thus increasing the distance between said shoes and said rail when in the suspended position, means operative to adjust the height of said track brake device above said rail, and means operable to render said last means effective in response to a movement of said brake device through a predetermined distance toward said rail.

8. In a magnetic track brake system, in combination, a magnetic track brake device, spring means for suspending said brake device from a vehicle truck and above a track rail, a stop element for adjusting the height of said track brake device above said rail when in release position, a second element coacting with said stop element, and means operative upon relative movement between said second element and said stop element for automatically adjusting said stop element to adjust the height at which said track brake device is suspended above said rail in release position.

9. In a magnetic track brake system, in combination, a vehicle truck frame, a magnetic track brake device, spring means for suspending said brake device from said vehicle frame and over a track rail, an adjustable stop device carried by said brake device for engaging an element on said truck frame, said adjustable stop device being adjustable to regulate the height of said track brake device above said track rail, a second element carried by said track brake device and being also adapted to engage an element on said truck frame when in moving toward the rail said track brake device moves through a greater than a predetermined distance, and means operative when said second member engages the element on said truck frame for actuating said adjustable stop device to regulate the height at which said track brake device is carried above the track rail.

10. In a magnetic track brake system, in combination, a magnetic track brake device, spring means for suspending said brake device from a vehicle truck and above a track rail, means for adjusting the height at which said spring means holds said track brake device above a track rail, and electropneumatic means operative in response to a predetermined movement of said track brake device toward said rail for operating said adjusting means.

11. In a vehicle brake system, in combination, a magnetic track brake device, spring means for suspending said magnetic track brake device from a vehicle truck and above a track rail, contacts closable in response to a predetermined movement of said track brake device toward said track rail, and means operative in response to closing of said contacts for determining the height at which said track brake device is carried above said track rail.

12. In a magnetic track brake system, in combination, a magnetic track brake device, spring means for suspending said magnetic track brake device from a vehicle truck and over a track rail, an adjustable stop device carried by said magnetic track brake device and adapted to engage an element on the vehicle truck to determine the height at which said track brake device is maintained suspended above said track rail, a set of normally open contacts, and means operative in response to the closing of said contacts for actuating said adjustable stop device to alter the distance at which said track brake device is maintained suspended above said track rail.

13. In a magnetic track brake system, in combination, a magnetic track brake device, spring means for suspending said track brake device from a vehicle truck and above a track rail, an adjustable stop device for determining the height at which said track brake device is maintained suspended above a track rail, pneumatic means for actuating said adjustable stop device to vary said height above said rail, electroresponsive valve means for controlling the operation of said pneumatic means, and contact members actuated by and in response to a predetermined movement of said track brake device toward engagement with the rail for controlling the operation of said electroresponsive valve means.

14. In a magnetic track brake system, in combination, a magnetic track brake device, spring means for suspending said track brake device from a vehicle truck and above a track rail, means for maintaining said track brake device suspended a predetermined distance above said track rail regardless of the wear of said track brake device during repeated braking operations, and means operative when said track brake device engages an obstruction between it and the rail for permitting said track brake device to raise above its normally suspended position without altering its normal adjustment above the track rail.

15. In a vehicle brake system, in combination, a vehicle truck frame, a magnetic track brake device, spring means for suspending said track brake device from said vehicle truck and above a track rail, an element carried by said truck frame, adjustable stop means carried by and movable with said track brake device for engaging said element, said stop means being automatically operable to maintain said track brake device suspended above a track rail by a predetermined distance, and yielding means associated with said truck frame element adapted to permit said track brake device to rise above said track rail to a distance greater than said predetermined distance when said track brake device strikes an obstruction on or adjacent said track rail.

CLYDE C. FARMER.